(12) United States Patent
Nguyen et al.

(10) Patent No.: US 9,177,428 B2
(45) Date of Patent: Nov. 3, 2015

(54) PREDICTIVE DIAGNOSTIC METHOD

(75) Inventors: Michael Nguyen, Norwalk, CA (US);
Robert Madison, Eastvale, CA (US);
Keith Andreasen, Garden Grove, CA (US)

(73) Assignee: Innova Electronics, Inc., Irvine, CA (US)

( * ) Notice: Subject to any disclaimer, the term of this patent is extended or adjusted under 35 U.S.C. 154(b) by 422 days.

(21) Appl. No.: 13/589,532

(22) Filed: Aug. 20, 2012

(65) Prior Publication Data

US 2014/0052328 A1 Feb. 20, 2014

(51) Int. Cl.
*G06F 7/00* (2006.01)
*G07C 5/08* (2006.01)

(52) U.S. Cl.
CPC .................. *G07C 5/0808* (2013.01)

(58) Field of Classification Search
CPC .. G07C 5/008; G07C 5/0808; G07C 2205/02;
G06F 17/00; G06F 7/00
USPC .......................................................... 701/29
See application file for complete search history.

(56) References Cited

U.S. PATENT DOCUMENTS

| | | |
|---|---|---|
| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,767,681 A | 6/1998 | Huang |
| 6,000,413 A | 12/1999 | Chen |
| 6,055,468 A | 4/2000 | Kaman |
| 6,438,471 B1 | 8/2002 | Katagishi |
| 6,499,385 B2 | 12/2002 | Protti |
| 6,868,369 B2 | 3/2005 | Huang |
| 6,940,270 B2 | 9/2005 | Chen |
| D510,287 S | 10/2005 | Chen |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |

(Continued)

FOREIGN PATENT DOCUMENTS

WO    WO0186576    11/2001

*Primary Examiner* — Redhwan k Mawari
*Assistant Examiner* — Rodney P King
(74) *Attorney, Agent, or Firm* — Stetina Brunda Garred & Brucker

(57) ABSTRACT

There is provided a method of predicting defects likely to occur in a vehicle over a predetermined period. The method includes receiving vehicle characteristic data regarding a vehicle under consideration, and comparing the received vehicle characteristic data with a defect database. The defect database includes information related to defects that have occurred in different vehicles and the mileage at which such defects occurred. The method additionally includes identifying defects that occurred in vehicles corresponding to use vehicle under consideration, and the mileage at which such defects occurred. Detects which fail to satisfy minimum count requirements are then filtered out, and the defects are then sorted in order of the highest defect count.

28 Claims, 5 Drawing Sheets

(56) References Cited

U.S. PATENT DOCUMENTS

| | | |
|---|---|---|
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,301,329 B2 | 10/2012 | Andreasen |
| 2008/0004764 A1 | 1/2008 | Chinnadurai et al. |
| 2008/0249681 A1 | 10/2008 | Bertosa et al. |
| 2009/0062978 A1* | 3/2009 | Picard .......................... 701/29 |

\* cited by examiner

| | 0 - 5K MILES | 5K - 10K MILES | 10K - 15K MILES | 15K - 20K MILES | 20K - 25K MILES | 25K - 30K MILES | ... |
|---|---|---|---|---|---|---|---|
| COMPONENT 1 | 0 | 0 | 3 | 0 | 5 | 7 | ... |
| COMPONENT 2 | 0 | 1 | 1 | 2 | 0 | 5 | ... |
| COMPONENT 3 | 0 | 1 | 0 | 1 | 1 | 0 | ... |
| COMPONENT 4 | 1 | 2 | 1 | 3 | 2 | 4 | ... |
| COMPONENT 5 | 0 | 1 | 0 | 0 | 1 | 0 | ... |
| % TOTAL | COMP. 4 - 100% | COMP. 2 - 20% / COMP. 3 - 20% / COMP. 4 - 40% / COMP. N - 20% | COMP. 1 - 60% / COMP. 2 - 20% / COMP. 4 - 20% | COMP. 2 - 34% / COMP. 3 - 16% / COMP. 4 - 50% | COMP. 1 - 25% / COMP. 3 - 11% / COMP. 4 - 22% / COMP. N - 11% | COMP. 1 - 43% / COMP. 2 - 31% / COMP. 4 - 25% | ... |

MILEAGE BRACKETS (column header); COMPONENTS LIKELY TO FAIL (row header)

FIG. 3

PREDICTIVE DIAGNOSTIC SUMMARY — 40

| COMPONENT LIKELY TO FAIL | PROBABILITY OF FAILURE | | |
|---|---|---|---|
| | LOW | MEDIUM | HIGH |
| COMPONENT 1 | ▨ | | |
| COMPONENT 2 | ▨▨ | | |
| COMPONENT 3 | ▨▨▨ | | |

FIG. 4

PREDICTIVE DIAGNOSTIC METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to automotive diagnostics, and more specifically, to a system and method of predicting automotive problems or failure based on a collection of historical information.

Automotive repair is, for the most part, inevitable. If driven long enough, most automobiles will require at least some form of routine maintenance and repair. Although repairs are almost certain, it is unknown as to when the vehicle will fail, and therefore, automotive failure usually comes as a surprise. Furthermore, the average vehicle owner does not know what those failures are likely to be or what the related cost of repair would entail.

The difficulty in predicting diagnostic events for a vehicle stem from the fact that different vehicles exhibit different vulnerabilities. Therefore, a particular component may be susceptible to failure in a particular vehicle, and not as susceptible to failure in another model of vehicle. Furthermore, that same component may have a different susceptibility of failure from one model year to the next in the same model of vehicle. Thus, there is not a universal, template or formula that can be applied to all vehicles for predicting when failure is likely to occur.

To the average automobile owner, there is a considerable amount of uncertainty associated with automotive diagnostics and repair. Automobiles are complex electro-mechanical devices, and as such, when a problem associated with the operation of the automobile arises, it may be well beyond the skill of the ordinary automobile owner to identity the problem and know how to perform the related fix. Thus, automobile owners have been relying on automotive professionals, such as a repair shop or dealership, to assist in the diagnosis and repair of their automobiles.

Although, automotive professionals may be helpful in diagnosing and repairing an automotive problem, there is a certain level of distrust consumers have associated with automotive professionals. In some instances, the automotive professionals may leverage their experience and knowledge when dealing with the consumer to drive up the cost or to encourage the consumer to make repairs winch may not be absolutely necessary. Therefore, consumers tend to feel as if they have been taken advantage of when they visit automotive professionals. That feeling is compounded by the tact that costs associated with having an automotive professional service your vehicle tends to be very high.

Aside from automotive professionals, oftentimes the best available information is from someone who currently owns or previously owned, the same year, make, and model of the vehicle under consideration. That person can describe their experience with the vehicle, including the maintenance history or any repairs that performed on the vehicle, and when those repairs took place (i.e., at 50,000 miles, etc.).

Although the information received from the experienced individual may provide some measure of assistance in gauging the diagnostic future of a particular vehicle, the information provided by the experienced individual may not be representative of a pattern of failure. In this regard, there is a likelihood that the failures, or lack thereof identified by the experienced individual may not be attributable to a reliable pattern, hut instead are simply anecdotal events which, may provide very little basis for reliability.

As such, there is a need in the art for a reliable and comprehensive predictive diagnostic system and method which provides a predictive diagnostic summary for a vehicle under consideration, wherein the predictive diagnostic summary is compiled, from a historical database of similar vehicles.

BRIEF SUMMARY

According to one embodiment of the present invention, there is provided a method of predicting defects likely to occur in a vehicle over a predetermined period. The method includes receiving vehicle characteristic data regarding a vehicle under consideration, and establishing a defect database including information related to defects that have occurred in different vehicles and the mileage at which such detects occurred. The method additionally includes identifying defects that occurred in vehicles corresponding to the vehicle under consideration, and the mileage at which such defects occurred. Defects which fail, to satisfy minimum count requirements are then filtered out, and the defects are then sorted in order of the highest defect count.

The received vehicle characteristic date may include the year, make, model, engine, and current mileage of the vehicle under consideration. The defect database information may include the year, make, model, engine, defect(s), and mileage of the referenced vehicle as of the time of each associated defect.

The method may additionally include the step of comparing vehicle characteristic data associated with the vehicle under test with vehicle characteristic data associated with the identified detects stored in the defect database to identity defects that have occurred in vehicles that substantially correspond to the vehicle under consideration.

The method may also include the step of restricting the identified defects to defects that have occurred in substantially corresponding vehicles that are associated with a reference mileage that is within a mileage bracket that substantially corresponds to the current mileage of the vehicle under test. The mileage bracket may extend item a mileage less than the current mileage to a mileage greater than the current mileage. The mileage bracket may extend from a mileage approximately 15,000 less than the current mileage to a mileage approximately 30,000 miles greater than the current mileage.

The method may additionally include the step of adjusting the current mileage to the nearest 5,000 mile gradient. The mileage bracket may extend from 15,000 miles less than the adjusted mileage to 30,000 miles greater than adjusted mileage.

The method may further include the step of receiving live data from the vehicle under consideration. The live data may include diagnostic information regarding operating characteristics of an automotive device associated with at least one defect, within the mileage bracket. The method may additionally include the step of adjusting the current mileage based on diagnostic information indicating the operating condition of the automotive device associated with the detect. The step of adjusting the current mileage may include the step of increasing the current mileage where the diagnostic information associated with the automotive device associated with the defect indicates that the associated device is not in optimum operating condition. The step of adjusting the current mileage may also include the step of increasing the current mileage where the diagnostic information indicates that, the device associated with the defect is in optimum operating condition.

The method may also include the steps of receiving information regarding the climatic region in which the vehicle under consideration has been used, and adjusting the current mileage based on the information regarding the climate region. The step of adjusting the current mileage based on the information regarding the climatic region may comprise the step of increasing the current mileage where the information regarding the climate region indicates that the vehicle has operated in a region characterized by harsh climate conditions. At least one defect may be associated with a climatically sensitive vehicle device, which may include a muffler, a body panel, a radiator, a battery, a door lock, and a starter.

The method may include the step of limiting the identified defects to those defects which occurred in a mileage bracket that includes the mileage of the vehicle under consideration.

The defects in the defect database may be derived from actual repair records, or front a probabilistic determination of a most likely defect based on vehicle diagnostic data.

The received vehicle characteristic data may include geographic information associated with the vehicle under consideration.

The method may include the step of adjusting the mileage associated with the identified defects based on vehicle characteristic data. The mileage associated with the identified defects may be lowered based on the vehicle characteristic data. The mileage associated with the identified defects may be raised based on the vehicle characteristic data.

According to another embodiment, there is provided a predictive diagnostic system for generating a predictive diagnostic report for a vehicle under consideration. The predictive diagnostic system includes a detect database having information related to defects that have occurred in different reference vehicles and the reference mileage at which such defects occurred, wherein each reference vehicle is associated with classification data. A comparison module is in operative communication with the defect database and is configured to compare vehicle characteristic data associated with the vehicle under consideration and to identify defects that have occurred in certain ones of the different reference vehicles having associated vehicle characteristic data that is substantially similar to the vehicle characteristic data, associated with the vehicle under consideration and a reference mileage that is substantially similar to the current mileage of the vehicle under consideration.

The predictive diagnostic system may also include a report generating module in operative communication with the comparison module and configured to generate a predictive diagnostic report including the identified detects and the reference mileage at which such defects occurred.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is one embodiment of a preliminary diagnostic matrix;

FIG. 4 is one embodiment of a predictive diagnostic report;

Figure 1:
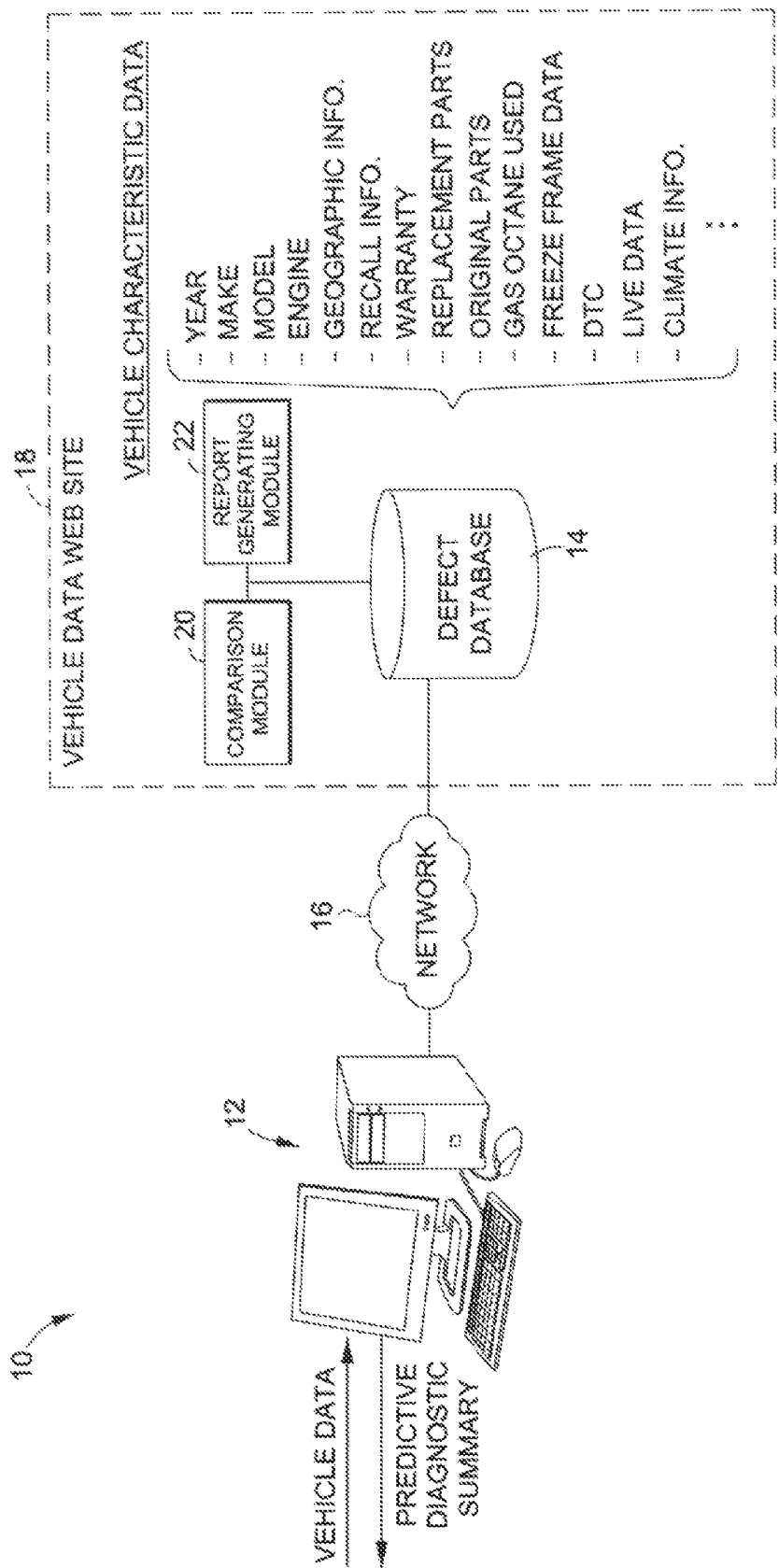
FIG. 1 is a schematic view of one embodiment of a predictive diagnostic system.
Figure 2:
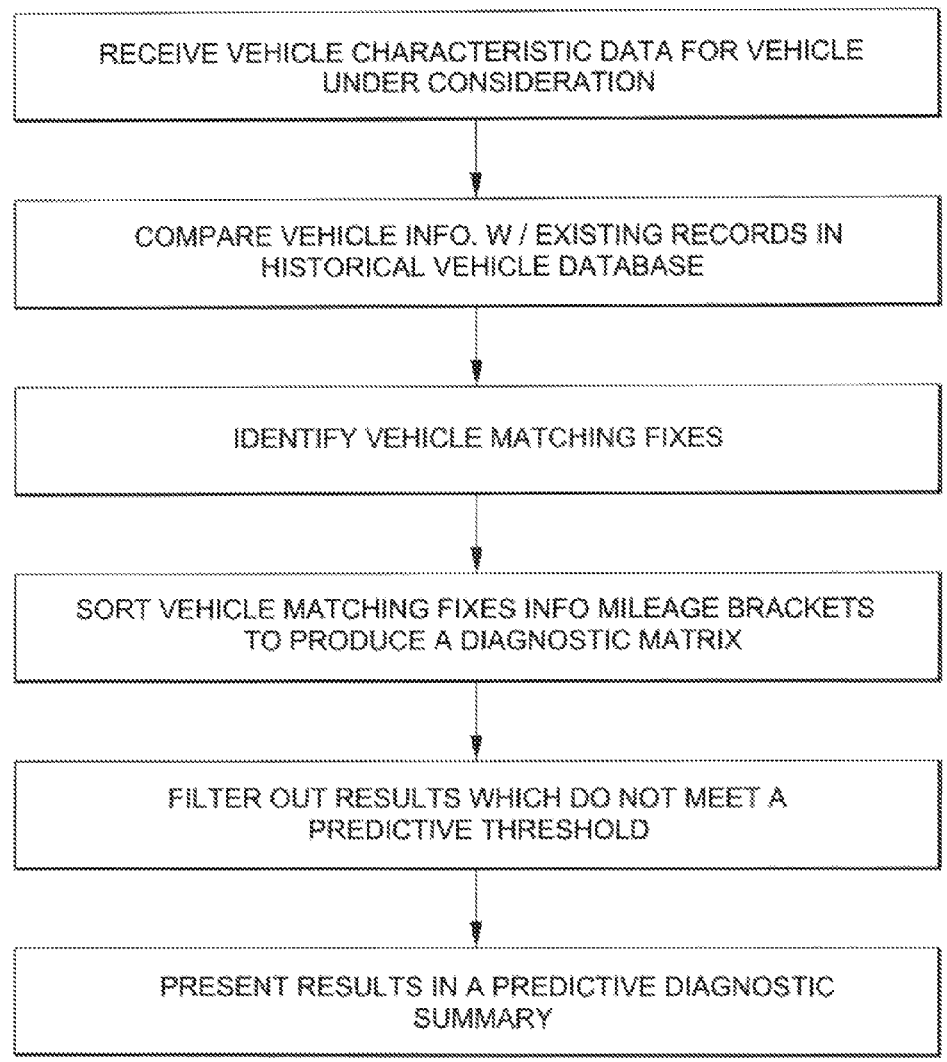
FIG. 2 is a flow chart listing the steps of one embodiment of a predictive diagnostic method.

The present invention is best understood, by reference to the following detailed description when read in conjunction with the accompanying drawings.

DETAILED DESCRIPTION

Referring now to the drawings, wherein the showings are for purposes of illustrating a preferred embodiment of the present invention only, and not for purposes of limiting the same, there is shown a predictive diagnostic system 10 capable of determining a likelihood of failure for a particular vehicle system or component. The predictive diagnostic system 10 compares vehicle characteristic data associated with a vehicle under consideration with information in a historical defect database to identify defects that have occurred in the same or substantially similar vehicles, and the mileage at which those defects occurred. In this regard, the predictive diagnostic system 10 may predict a low, medium or high probability of failure for a component(s) within a certain mileage range, and thus, provides the owner of the vehicle with a probable likelihood of which components are likely to fail over certain mileage ranges. The predictive diagnosis may allow the owner to preempt the failure by replacing the component beforehand, or if the vehicle begins to operate at a sub-optimal level, the owner will have a good idea of what component may need replacing. Therefore, the owner may be able to resolve the problem on his own, or if the owner takes the vehicle to an automotive professional, the owner will have a good idea of what is needed to fix the problem, rather than relying solely on the recommendation of the automotive professional.

Referring now specifically to FIG. 1, the predictive diagnostic system 10 includes an electronic computing device 12 and a historical defect database 14 in operative communication with each other through a network 16. The computing device 12 is operative to allow the user to upload/input vehicle characteristic data for the vehicle under consideration. In this regard, the computing device 12 may be a desktop computer, laptop computer, tablet computer, smart phone, personal digital assistant or other computing devices known by those skilled in the art. As shown in FIG. 1, the historical defect database 14 is hosted on a server, which may be accessible by the computing device 12 via a website 18 which may be a subscription based website or offered as a part of a vehicle service/warranty plan. The user may visit or log on to the website 18 to upload the vehicle characteristic data to the historical defect database 14, as will be described in more detail below. Information is exchanged between the website 18 and the computing device 12 via the network 16, which may include the Internet, a local area network, or other communication systems.

The historical database 14 is a comprehensive compilation of historical vehicle data. Each entry into the database 14 relates to a system or component failure for a specific vehicle associated with characteristic data representative of the vehicle. For instance, the characteristic data may include the year, make, model and engine of the vehicle. Therefore, to determine the predictive diagnosis for the vehicle under consideration, the characteristic data associated the vehicle under consideration is entered into the defect, database 14 and the characteristic data is matched with vehicle data in the database associated with similar characteristic data to determine the likelihood of failure within a certain mileage range.

The failures/defects listed in the historical defect database 14 may be identified according to several different strategies, in one embodiment the defects are associated with actual repairs performed in a repair shop. In another embodiment, the defects are determined by insurance claims submitted to an insurance company. In yet another embodiment the defects are determined based on a probabilistic determination of a likely defect based on an analysis of vehicle data. For more information related to the probabilistic determination, please see U.S. patent Ser. No. 13/567,745. The failures/defects listed in the database 14 may also be determined according to a combination of any of the strategies listed above, or according to other means known by those skilled in the art.

The system 10 further includes a comparison module 20 and a report generating module 22 in operative communication with each other and the defect database/server 14. The comparison module 20 is operative to match the vehicle characteristic data associated with the vehicle under consideration with similar data found in the database 14 to identify defects which have occurred in those matching vehicles. The report generating module 22 is operative to compile the results and generate the predictive diagnostic report, which is presented to the user.

The following example illustrates benefits which the predictive diagnostic system 10 provides. In this example, the vehicle under consideration is a 2005 HONDA™ ACCORD™, although it is understood that the predictive diagnostic system 10 may be used with any vehicle. The defect database 14 includes several entries related to a 2005 HONDA™ ACCORD™. Based on those entries, an owner of a 2005 HONDA ACCORD can determine the likelihood that his vehicle will experiences problems at certain mileage ranges, for example, between 75,000 and 100,000 miles, there may be a high likelihood that the owner may need to replace the ignition coil, a median, probability or likelihood, that the user will, need to replace the camshaft position sensors, and a low probability that the owner will need to replace the engine coil module.

According to one embodiment, the input into the defect database 14 is vehicle characteristic data representative of the vehicle under consideration. Thus, the more vehicle characteristic data entered by the user, the more accurate and precise the resultant predictive diagnosis will be. Along these lines, the vehicle characteristic data may not only include year, make, model, and engine, as mentioned above, but may also include other information that is specific to the vehicle under consideration. For instance, the vehicle characteristic data may include the geographic area (state, city, zip code, etc.) or climatic conditions in which the vehicle is primarily driven. Vehicles in different geographic areas may encounter symptoms related to the geographic area in which the vehicle is driven. Far instance, vehicles driven in the northern part of the United States regularly encounter snow in the winter months. Road maintenance crews in those areas of the country regularly spread salt on the roads to mitigate slippery road conditions. Thus, as the vehicle drives over the salted roads, the undercarriage of the vehicle may be exposed to the salt, which may cause rust/corrosion or may lead to other problematic conditions.

However, vehicles driven in southern states may not be susceptible to the same problems since those vehicles are generally not driven over salted roads. However, other geographic locations offer different environmental conditions which may be problematic for the vehicle, i.e., desert areas may lead to engine overheating. Therefore, the geographic location in which the vehicle under consideration is driven may lead to a more accurate and precise predictive diagnosis. Exemplary components/devices which may be climatically or geographically sensitive include may include the vehicle's muffler, body panel (susceptible to rust), radiator, battery, door lock, and starter.

Other vehicle characteristic data which may be entered into the historical database is recall information, usage information (i.e., how many miles the vehicle is driven per year), warranty information, replacement parts on the vehicle, original parts on the vehicle, gas octane used, maintenance records. Thus, the vehicle characteristic data entered into the defect database 14 allows the user to obtain matches with vehicle records associated with vehicles that not only are the same or similar to the vehicle under consideration, but were also operated and maintained in a similar fashion.

According to one embodiment and referring now specifically to FIG. 3, after the vehicle characteristic data is entered into the defect database 14, a preliminary diagnostic matrix 30 will be generated which shows the predicted components/systems that are likely to fail along one axis, and several mileage brackets along another axis. The body of the matrix 30 is filled with the number of failures associated with the respective components/systems occurring in each mileage bracket for the respective components.

The number of failures may then be totaled for each component within each mileage bracket to determine a percentage of failure (see bottom row of matrix 30). For instance, as shown in the example depicted in FIG. 3, there was only 1 failure within the 0-5,000 mile bracket, with that sole failure being attributable to Component 4. Thus, Component 4 comprises 100% of the failures in the 0-5,000 mileage bracket. In the 5,000-10,000 mileage bracket, there were 5 total failures, with one being attributable to Component 2, one being attributable to Component 3, two being attributable to Component 4 and one being attributable to Component 5. Thus, Component 2 comprises 20% of the failures, Component 3 comprises 20% of the failures, Component 4 comprises 40% of the failures and Component 5 comprises 20% of the failures. This totaling process is completed to determine the percentage of failure for the components failing in each mileage bracket.

In one implementation, the predictive diagnostic system 10 may filter out results which do not meet or exceed a defined threshold. In this regard, it is desirable to only report failures which are believed to be representative of a pattern, and thus indicative of a probable outcome in the future. If there are only a minimum number of failures, i.e., failures below the set threshold, such a minimum number of failures may not be a reliable data-set for representing a potential failure in the future. The threshold may be selectively adjusted by the system operator, or by the user. The threshold may be low for newer vehicles, since there is generally less data associated with the new vehicles, and high for older vehicles, since there is generally more data associated with the older vehicles.

Referring again to FIG. 3, a threshold of two (2) may be set to filter out all failures that only occur once. Therefore, applying the threshold to the matrix 30, there are no failures that satisfy the threshold in the 0-5,000 mile bracket, only two failures (Component 4) that satisfy the threshold in the 5,000-10,000 mile bracket, three failures (Component 1) that satisfy the threshold in the 5,000-15,000 mile bracket, five failures (Components 2 and 4) that satisfy the threshold in the 15,000-20,000 mile bracket, seven failures (Components 1 and 4) that satisfy the threshold in the 20,000-25,000 mile bracket, and sixteen failures (Components 1, 2, and 4) in the 25,000-30,000 mile bracket.

The matrix 30 may further be beneficial to identify clusters of failures at certain mileage points. For instance, with regard to Component 1 listed in the example matrix, there are three failures between 10,000-15,000 miles and live failures between 20,000-25,000 miles, although there are zero failures in the intermediate mileage bracket (i.e., 15,000-20,000 miles).

After the thresholds have been applied, the overall percentages may be recalculated to determine the percentage of failures within each mileage bracket that meet the threshold.

The results may be presented to the user in a user friendly summary 40. FIG. 4 shows an exemplary predictive diagnostic summary 40 which displays each component and the likelihood, of failure associated with each component. The likelihood of failure is represented as either being LOW, MEDIUM, or HIGH. A LOW likelihood of failure may be associated with 0-30% chance of failure, a MEDIUM likelihood of failure may be associated with 30%-60% chance of failure, while a HIGH likelihood of failure may be associated with a 60%-100% chance of failure. If Is also contemplated that the probability of failure may be presented in numerical terms, i.e., the actual likelihood of failure percentage associated with that component. The chances of failure listed above with each likelihood of failure are exemplary in nature only and are not intended to limit the scope of the present invention.

In one embodiment, the predictive diagnostic system 10 may also be capable of looking up prices, repair shops, and/or repair procedures tor fixing/replacing the components listed in the predictive diagnostic summary 40.

According to other implementation of the present invention, the predictive failure analysis may also be refined based on specific diagnostic history of the vehicle under consideration, in other words, the predictive failure analysis may be able to correlate one part failing in response to another part failing in the past. More specifically, one part or component which wears out may have a cascading effect on wearing out other parts or components, particularly other parts or components within the same vehicle system. Thus, there may be a system level correlation when one part has failed in the past.

The system 10 may also be capable of adjusting the predictive diagnosis for the vehicle under consideration based on information received from the vehicle, such as live data. The predictive diagnostic system 10 may generate a baseline predictive diagnostic summary when characteristic data is uploaded to the historical database, as described above. From the baseline predictive diagnostic summary, the system 10 may be able to make a prediction as to the general health or remaining effectiveness/lifespan of one or more vehicle components. For instance, the baseline predictive diagnostic summary may used to predict that a particular component may be useful for another 5,000 miles before the likelihood of failure increases to the point where a failure is likely.

The information extrapolated from the baseline predictive diagnostic summary may be cross-referenced with live data to provide a more accurate prediction as to the remaining lifespan of that component. For instance, if the live data shows a relatively healthy component, the prediction of 5,000 miles before a likely failure may be increased. Conversely, if the live data shows a relatively worn or ineffective component the prediction of 5,000 miles before a likely failure may be decreased.

Thus, the system 10 may conduct an iterative analysis based on the live data to more accurately predict the likelihood of failure. The iterations include initially generating the baseline diagnostic report from basic characteristic data, i.e., year, make, model. Then the prediction may be refined based on the five data supplied to the system 10. In this regard, the likelihood of failure may be increased, decreased, or remain unchanged based on the live data.

Figure 5A:
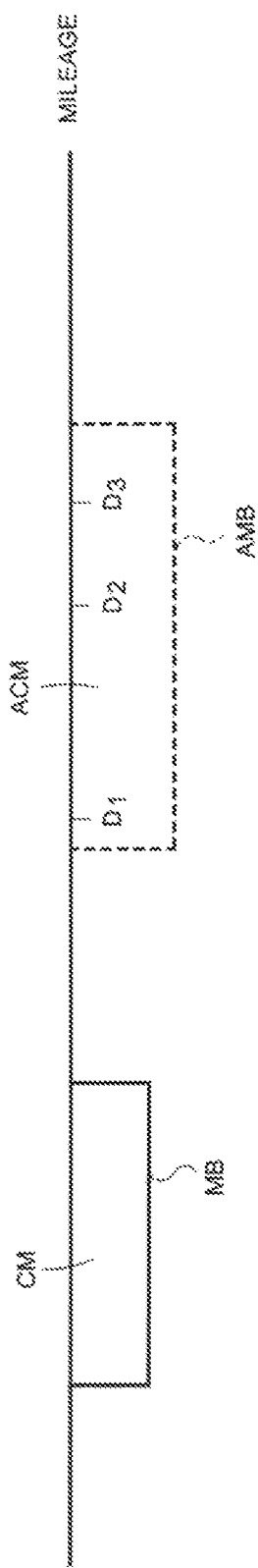
FIG. 5A is a schematic view of adjusting a mileage bracket to identify defects within an adjusted mileage bracket.

Referring now specifically to FIG. 5A, there is shown a schematic view of an adjustment made based on information received from the vehicle, in FIG. 5A, the current mileage "CM" of the vehicle under consideration is identified on a mileage axis. A mileage bracket "MB" is defined along the mileage axis, wherein the mileage bracket MB includes the current mileage CM. The mileage bracket MB may extend front a mileage less than the current mileage CM to a mileage more than the current mileage CM. For instance, the mileage bracket MB may extend for 10,000 miles, and extend from 2,500 miles less than the current mileage CM, to 7,500 more than the current mileage CM. Those skilled in the art will readily appreciate that the upper and lower bounds to the mileage bracket MB may be selectively adjusted as desired by the user.

After vehicle information is analyzed, the current mileage "CM" may be adjusted to define an adjusted current mileage "ACM". For instance, if the vehicle was driven off-road, in harsh conditions, etc., the vehicle may have endured "hard miles." Thus, the current mileage CM for the vehicle may be increased to account for the hard miles. Conversely, if the vehicle was almost exclusively driven in ideal driving conditions, and has been routinely maintained, the current mileage CM of the vehicle may be decreased to account for the optimal conditions. In the example listed in FIG. 5A, the current mileage CM has been increased to define an adjusted current mileage ACM that is greater than the current mileage.

Once the adjusted current mileage ACM has been determined, an adjusted mileage bracket "AMB" is defined based on the adjusted current mileage ACM. The defects which fall within the adjusted mileage bracket AMB are then identified. In FIG. 5A, the defects falling within the adjusted mileage bracket AMB include defects D1, D2, and D3.

Figure 5B:
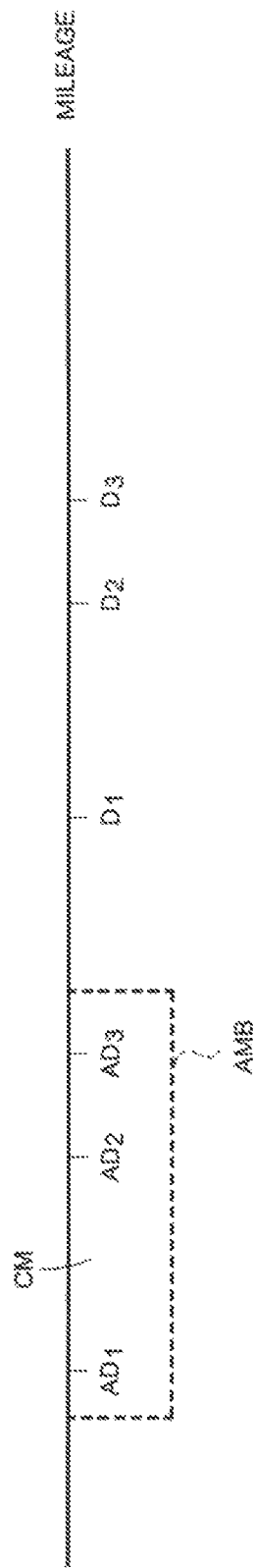
FIG. 5B is a schematic view of adjusting defects and identifying adjusted defects within a mileage bracket.

In the example described above in relation to FIG. 3A, the current mileage is adjusted to define an adjusted current mileage to determine the defects associated with the vehicle. In FIG. 5B, the mileage associated with the defects is adjusted based on the information received from the vehicle. In other words, the information, received from the vehicle may make it more likely that defects will occur sooner (i.e., after fewer miles) or later (i.e., after more miles).

Alter a preliminary assessment, the current mileage CM and defects D1, D2, D3 may be plotted on the mileage axis. A more detailed analysis may reveal, that the effective life of the vehicle is less than the standard or more than the standard. Therefore, the mileage associated with the defects may be adjusted along the mileage axis, accordingly. When the effective life of the vehicle is more than the standard, the mileage associated with the defects may be increased, and conversely, if the effective life of the vehicle is less than the standard, the mileage associated with the defects may be decreased.

After this analysis, an adjusted mileage bracket AMB may be created to include the current mileage CM of the vehicle. The adjusted defects AD1, AD2, and AD3 which fall within the adjusted mileage bracket AMB may then be identified.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of predicting defects likely to occur in a vehicle over a predetermined period, the method comprising:
   a) receiving, at a server, vehicle characteristic data regarding a vehicle under consideration;
   b) establishing a defect database at the server, the defect database having information related to defects that have occurred in different vehicles and the reference mileage at which such defects occurred;
   c) identifying, at the server, defects that occurred in vehicles corresponding to the vehicle under consideration, and the reference mileage at which such defects occurred;
   d) comparing, at the server, vehicle characteristic data associated with the vehicle under test with vehicle characteristic data associated with the identified defects stored in the defect database to identify defects that have occurred in vehicles that substantially correspond to the vehicle under consideration; and
   e) restricting, at the server, the identified defects to defects that have occurred in substantially corresponding vehicles that are associated with a reference mileage that is within a mileage bracket that extends from a mileage approximately 15,000 miles less than the current mileage to a mileage approximately 30,000 miles greater than the current mileage.

2. The method as recited in claim 1, wherein the received vehicle characteristic data includes the year, make, model, engine, and current mileage of the vehicle under consideration.

3. The method as recited in claim 2, wherein the defect database information includes the year, make, model, engine, defect(s), and the reference mileage associated with each identified associated defect.

4. The method as recited in claim 1, further including the step of adjusting the current mileage to the nearest 5,000 mile gradient.

5. The method as recited in claim 1, wherein the mileage bracket extends from 15,000 miles less than the adjusted mileage to 30,000 miles greater than adjusted mileage.

6. The method as recited in claim 1, further including the step of receiving live data from the vehicle under consideration, the live data including diagnostic information regarding operating characteristics of an automotive device associated with at least one defect within the mileage bracket.

7. The method as recited in claim 1, further including the step of adjusting the current mileage based on diagnostic information indicating the operating condition of the automotive device associated with the defect.

8. The method as recited in claim 7, wherein the step of adjusting the current mileage includes the step of increasing the current mileage where the diagnostic information associated with the automotive device associated with the defect indicates that the associated device is not in optimum operating condition.

9. The method as recited in claim 7, wherein the step of adjusting the current mileage includes the step of increasing the current mileage where the diagnostic information indicates that the device associated with the defect is in optimum operating condition.

10. The method as recited in claim 1, further comprising the steps of receiving information regarding the climatic region in which the vehicle under consideration has been used, and adjusting the current mileage based on the information regarding the climate region.

11. The method as recited in claim 10, wherein the step of adjusting the current mileage based on the information regarding the climatic region comprises the step of increasing the current mileage where the information regarding the climate region indicates that the vehicle has operated in a region characterized by harsh climate conditions.

12. The method as recited in claim 11, wherein at least one defect is associated with a climatically sensitive vehicle device.

13. The method as recited in claim 12, wherein the climatically sensitive device includes at least one in the group consisting of: a muffler, a body panel, a radiator, a battery, a door lock, and a starter.

14. The method as recited in claim 1, further comprising the step of limiting the identified defects to those defects which occurred in a mileage bracket that includes the mileage of the vehicle under consideration.

15. The method as recited in claim 1, wherein the defects in the defect database are derived from actual repair records.

16. The method as recited in claim 1, wherein the defects in the defect database are derived from a probabilistic determination of a most likely defect based on vehicle diagnostic data.

17. The method as recited in claim 1, wherein the received vehicle characteristic data includes geographic information associated with the vehicle under consideration.

18. The method as recited in claim 1, further including the step of adjusting the mileage associated with the identified defects based on vehicle characteristic data.

19. The method as recited in claim 18, wherein the mileage associated with the identified defects is lowered based on the vehicle characteristic data.

20. The method as recited in claim 18, wherein the mileage associated with the identified defects is raised based on the vehicle characteristic data.

21. A predictive diagnostic system for generating a predictive diagnostic report for a vehicle under consideration, the predictive diagnostic system comprising:
   a defect database located in a server, the defect database having information related to defects that have occurred in different reference vehicles and the reference mileage at which such defects occurred, each reference vehicle being associated with characteristic data; and
   a comparison module located in the server and in operative communication with the defect database, the comparison module configured to compare vehicle characteristic data associated with the vehicle under consideration and to identify defects that have occurred in certain ones of the different reference vehicles having associated vehicle characteristic data that is substantially similar to the vehicle characteristic data associated with the vehicle under consideration over a mileage range that extends at least 10,000 miles beyond the current mileage of the vehicle under consideration.

22. The predictive diagnostic system recited in claim 21, further comprising a report generating module in operative communication with the comparison module and configured to generate a predictive diagnostic report including the identified defects and the reference mileage at which such defects occurred.

23. The predictive diagnostic system recited in claim 21, wherein the vehicle characteristic data includes year, make, and model of the vehicle under consideration.

24. The predictive diagnostic system recited in claim 23, wherein the vehicle characteristic data further includes data selected from the group comprising: geographic information related to the operating environment of the vehicle under consideration and climatic information relating to the operating environment.

25. The predictive diagnostic system recited in claim 21, wherein the vehicle characteristic data associated with the vehicle under consideration includes live data from the vehicle under consideration.

26. A method of predicting defects likely to occur in a vehicle over a predetermined period, the method comprising:
   a) receiving, at a server, vehicle characteristic data regarding a vehicle under consideration;
   b) establishing a defect database in the server, the defect database having information related to defects that have occurred in different vehicles and the reference mileage at which such defects occurred;
   c) identifying, at the server, defects that occurred in vehicles corresponding to the vehicle under consideration, and the reference mileage at which such defects occurred;
   d) comparing, at the server, vehicle characteristic data associated with the vehicle under test with vehicle characteristic data associated with the identified defects stored in the defect database to identify defects that have occurred in vehicles that substantially correspond to the vehicle under consideration; and
   e) restricting, at the server, the identified defects to defects that have occurred in substantially corresponding vehicles that are associated with a reference mileage that is within a mileage bracket that extends at least 10,000 miles beyond the current mileage of the vehicle.

27. A method of predicting defects likely to occur in a vehicle over a predetermined period, the method comprising:
   a) receiving, at a server, vehicle characteristic data regarding a vehicle under consideration;
   b) establishing a defect database in the server, the defect database having information related to defects that have occurred in different vehicles and the reference mileage at which such defects occurred;
   c) identifying, at the server, defects that occurred in vehicles corresponding to the vehicle under consideration, and the reference mileage at which such defects occurred;
   d) comparing, at the server, vehicle characteristic data associated with the vehicle under test with vehicle characteristic data associated with the identified defects stored in the defect database to identify defects that have occurred in vehicles that substantially correspond to the vehicle under consideration; and
   e) restricting, at the server, the identified defects to defects that have occurred in substantially corresponding vehicles that are associated with a reference mileage that is within a mileage bracket that extends 10,000 miles about the current mileage of the vehicle.

28. A method of predicting defects likely to occur in a vehicle over a predetermined period, the method comprising:
   a) receiving, at a server, vehicle characteristic data regarding a vehicle under consideration;
   b) establishing a defect database in the server, the defect database having information related to defects that have occurred in different vehicles and the reference mileage at which such defects occurred;
   c) identifying, at the server, defects that occurred in vehicles corresponding to the vehicle under consideration, and the reference mileage at which such defects occurred;
   d) comparing, at the server, vehicle characteristic data associated with the vehicle under test with vehicle characteristic data associated with the identified defects stored in the defect database to identify defects that have occurred in vehicles that substantially correspond to the vehicle under consideration; and
   e) restricting, at the server, the identified defects to defects that have occurred in substantially corresponding vehicles that are associated with a reference mileage that is within a mileage bracket that is sufficiently extensive as to encompass vehicle defects that are unrelated to any current vehicle defects.

* * * * *